June 25, 1946.    W. J. COOLEY    2,402,733
AIRCRAFT WING STRUCTURE
Filed March 23, 1943    3 Sheets—Sheet 2
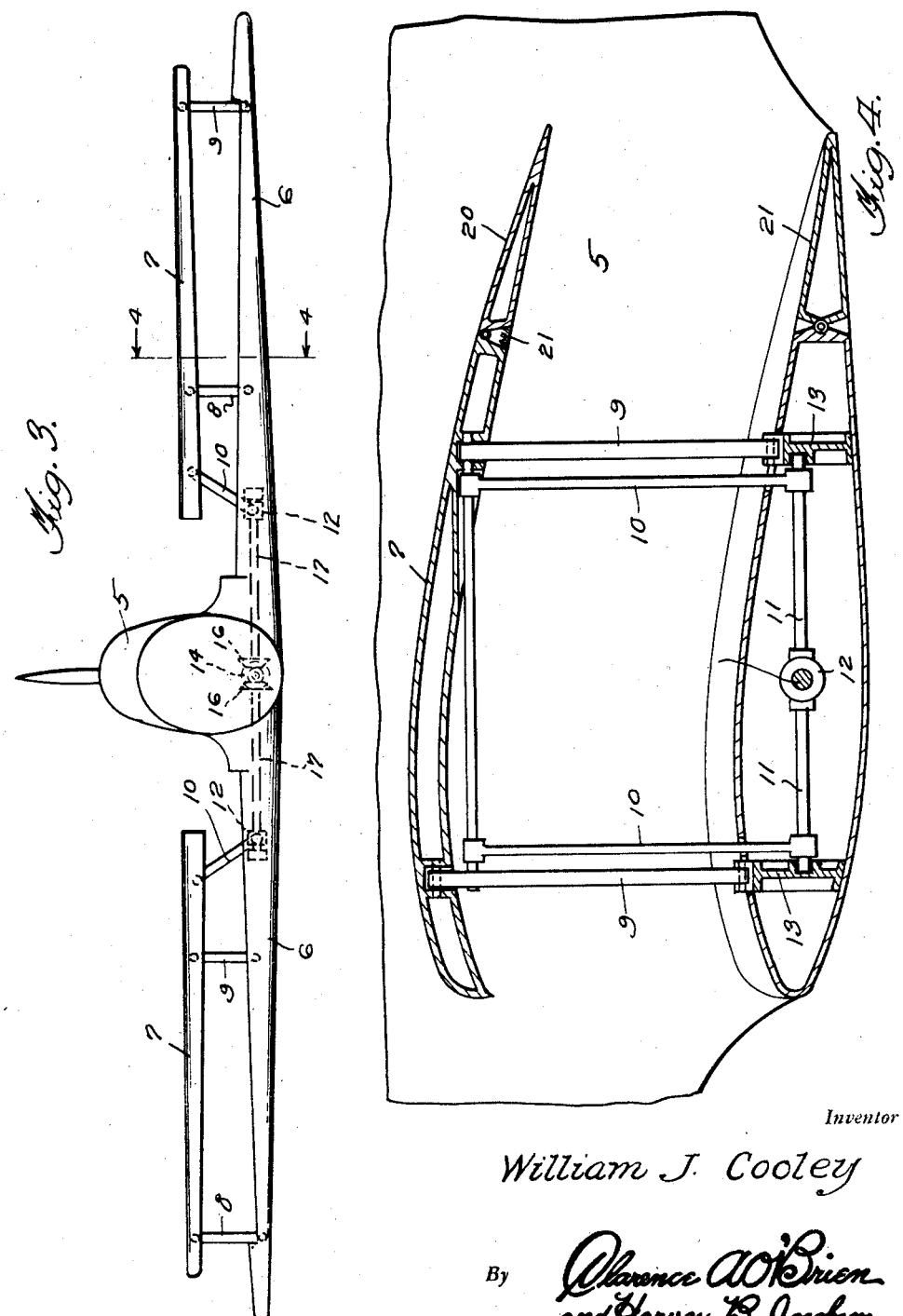
Inventor
William J. Cooley
By Clarence A. O'Brien
and Harvey B. Jacobson
Attorney

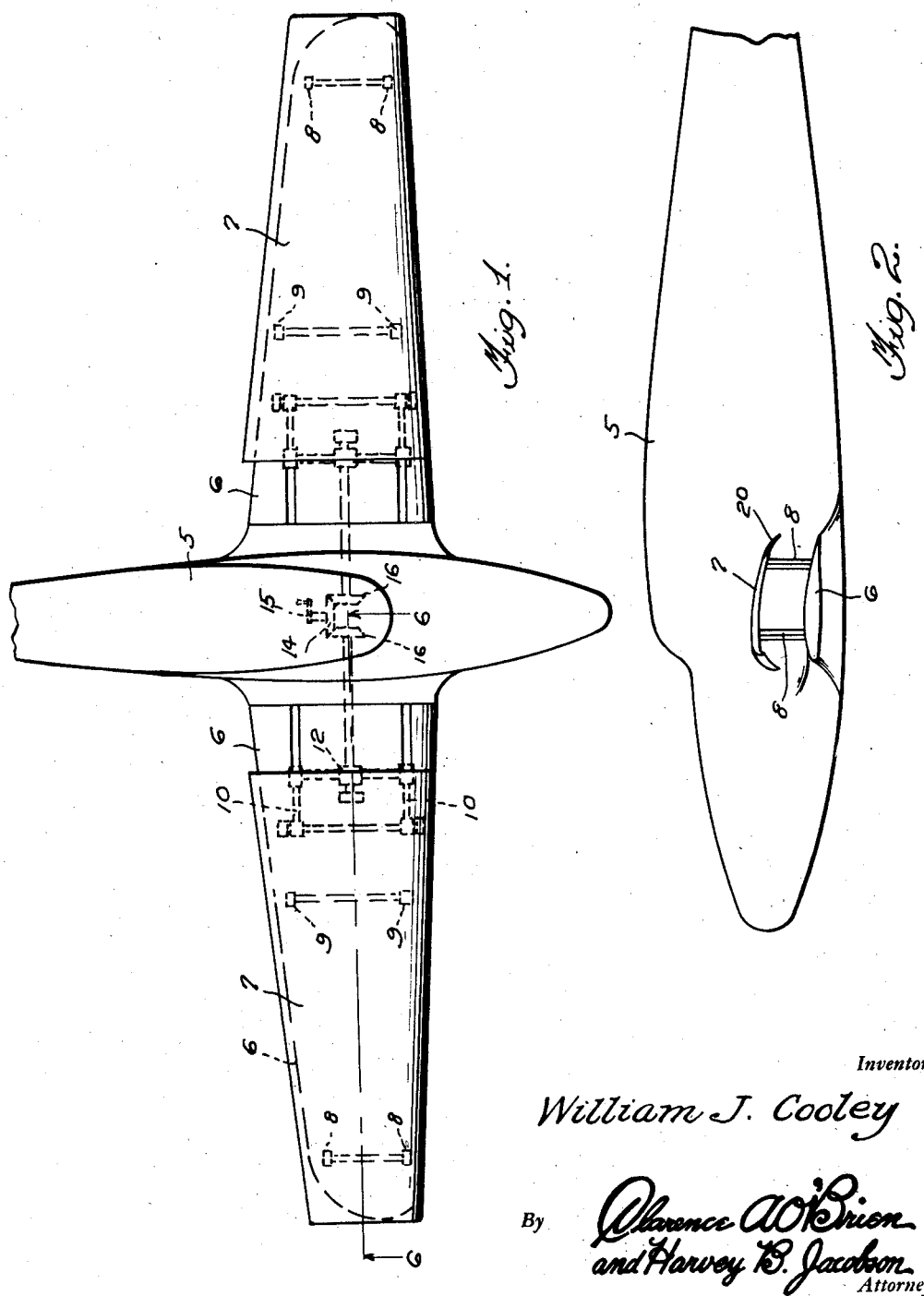

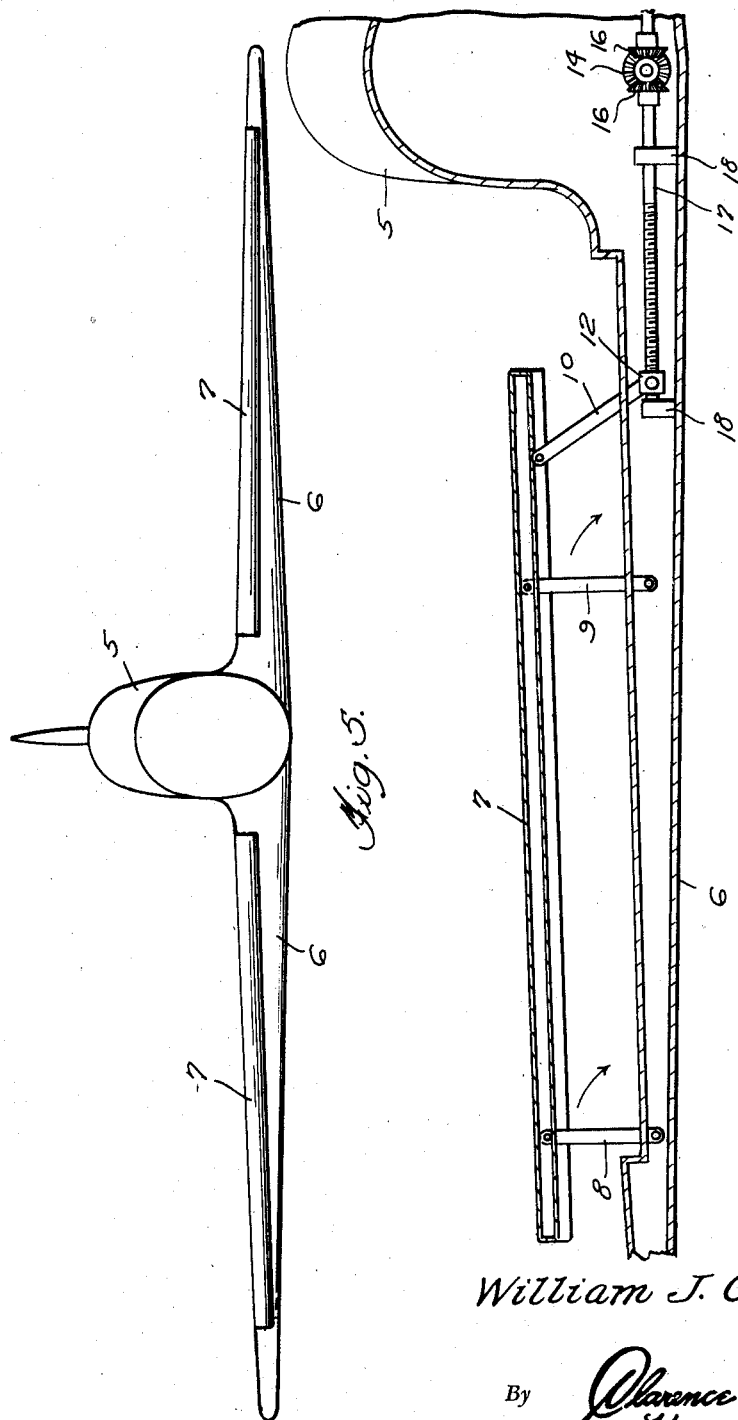

Patented June 25, 1946

2,402,733

UNITED STATES PATENT OFFICE 2,402,733

AIRCRAFT WING STRUCTURE

William J. Cooley, Lawrenceville, Ga., assignor of one-fourth to Pemberton Cooley, Jr., one-fourth to Hugh Thompson Cooley, and one-fourth to James Glass Cooley Application March 23, 1943, Serial No. 480,207

1 Claim. (Cl. 244—43)

This invention relates to new and useful improvements in aeronautics and more particularly to aeroplane wing structures.

The principal object of the present invention is to provide wing structures for aircraft whereby a monoplane high speed wing structure can be modified to provide a dual or biplane wing assembly for the purpose of affording greater lifting power when needed for taking off and/or landing with heavy loads.

Another important object of the present invention is to provide a modifiable wing structure of the character stated which will permit safe operation from restricted landing or take-off areas.

Another important object of the present invention is to provide a modifiable wing structure of the character stated which will permit the aircraft to be air-borne at much lower speed affording a wider speed range or greater difference between maximum and minimum speeds.

Another important object of the present invention is to provide a modifiable wing structure of the character stated whereby the proportionately greater increase in lift near the wing tips affords greater lateral stability and greatly decreased tendency to fall off on one wing or spin when the aircraft is completely stalled with auxiliary wing extended.

Other objects and advantages of the invention will become apparent to the reader of the following description.

In the drawings:

Figure 1 represents a fragmentary top plan view of the aircraft.

Figure 2 is a fragmentary side elevational view of the plane.

Figure 3 is a front elevational view of the aircraft.

Figure 4 is an enlarged fragmentary sectional view taken substantially on the line 4—4 of Figure 3.

Figure 5 is a front elevational view of the aircraft with the auxiliary wings retracted.

Figure 6 is an enlarged fragmentary sectional view taken substantially on the line 6—6 of Figure 1.

Referring to the drawings wherein like numerals designate like parts, it can be seen that numeral 5 denotes a fuselage from which extends laterally, a pair of monoplane wings 6, 6. This plane is of the high speed type with low lifting ability.

This type of high speed aircraft, in carrying out the present invention, is supplemented by a pair of auxiliary wings 7, 7, which wings are connected, each to its corresponding underlying wing 6 by two pair of pivotal struts 8, 9.

Each auxiliary wing 7 has a pair of lifting arms 10, 10, these arms 10 being secured to the end portions of rods 11, 11 which project horizontally in opposite directions from a nut 12. The end portions of the bars 11, 11 ride in channeled tracks 13, as is shown in Figure 4.

In the cockpit or cabin of the fuselage 5 is a bevel gear 14 which can be rotated by a crank 15 or some power driven means. The bevel gear 14 meshes with a pair of bevel gears 16, 16 which are on adjacent ends of a pair of aligned screw shafts 17, these shafts being journaled through bearings 18 and threaded through the corresponding nuts 12.

It can now be seen that in flight, the auxiliary wings 7, 7 may be nested upon the wings 6, 6 but when the plane is to land or when it is to take off with a heavy load, the auxiliary wings 7 can be lifted by rotating the gear 14 resulting in the rotation of the screw shafts 17 which serve to feed the nuts 12 and actuate the arms 17 so that the auxiliary wings 7 are lifted on their struts 8, 9.

As can be seen in Figure 4, the rear end portions of the auxiliary wings 7 have yieldable flaps 20, preferably held in place by springs 21 and the purpose of having these flaps is to permit free operation of the ailerons 21 located on the normal wings 6, 6.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

An airplane including a fuselage having two supporting surfaces, one of the supporting surfaces being movable into positions respectively in superimposed contacting relation to and in spaced superposed relation to the other surface, the movable supporting surface comprising separate wings movable toward and away from each other, means to move the wings into the superimposed position when they are moved toward each other and to move them into the superposed position when they are moved away from each other, said means including pairs of front and rear struts pivoted at corresponding ends to the wings and at their other ends to said other supporting surface, the pivots of said struts being in fixed location with respect to the wings and said other surface and having their axes parallel with the longitudinal axis of the fuselage, pairs of front and rear lifting arms similarly pivoted at corresponding ends to the inner end portions of the wings, rods connecting the other ends of said pairs of lifting arms, pairs of guide tracks receiving the ends of said rods and mounted in said other surface parallel with the transverse axis of the fuselage, nuts in the intermediate portions of said rods, screw shafts journaled in said other surface parallel with and between said pairs of tracks, and threaded through the nuts, and means in the fuselage for rotating said shafts.

WILLIAM J. COOLEY.